(12) United States Patent
Wei et al.

(10) Patent No.: US 10,513,153 B2
(45) Date of Patent: *Dec. 24, 2019

(54) RFID WEAR SENSING FOR TIRE APPLICATIONS

(71) Applicant: Bridgestone Americas Tire Operations, LLC, Nashville, TN (US)

(72) Inventors: Terence Wei, Copley, OH (US); Paul Wilson, Tallmadge, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/911,297

(22) Filed: Mar. 5, 2018

(65) Prior Publication Data
US 2018/0194175 A1    Jul. 12, 2018

Related U.S. Application Data

(63) Continuation of application No. 15/540,375, filed as application No. PCT/US2015/063574 on Dec. 3, 2015, now Pat. No. 9,944,131.

(60) Provisional application No. 62/098,435, filed on Dec. 31, 2014.

(51) Int. Cl.
| | | |
|---|---|---|
| *B60C 23/00* | (2006.01) | |
| *B60C 11/24* | (2006.01) | |
| *G06K 19/077* | (2006.01) | |
| *B60C 23/06* | (2006.01) | |

(52) U.S. Cl.
CPC ............ *B60C 11/243* (2013.01); *B60C 11/24* (2013.01); *B60C 11/246* (2013.01); *G06K 19/07764* (2013.01); *B60C 23/06* (2013.01)

(58) Field of Classification Search
CPC ..... B60C 11/243; B60C 11/24; B60C 11/246; B60C 23/06; G06K 19/07764
USPC .......................................................... 340/442
See application file for complete search history.

(56) References Cited

U.S. PATENT DOCUMENTS

| | | | |
|---|---|---|---|
| 5,218,861 A | 6/1993 | Brown | |
| 5,500,065 A | 3/1996 | Kock | |
| 5,749,984 A | 5/1998 | Frey | |
| 6,307,477 B1 * | 10/2001 | Starkey | ............... B60C 23/0493 340/584 |
| 6,581,657 B1 | 6/2003 | Brown | |

(Continued)

FOREIGN PATENT DOCUMENTS

| | | |
|---|---|---|
| EP | 2275286 | 1/2011 |
| EP | 2390859 | 11/2011 |

(Continued)

OTHER PUBLICATIONS

Search Report and Written Opinion; Corresponding PCT Application No. PCT/US2015/063574 filed Dec. 3, 2015; Authorized Officer Bae, Geun Tae; dated Feb. 23, 2016.

(Continued)

*Primary Examiner* — Zhen Y Wu

(57) ABSTRACT

A tire includes a circumferential tread and a radio-frequency identification (RFID) chip disposed below the circumferential tread. The RFID chip includes a chip casing and a local antenna. The tire further includes an RFID antenna disposed radially between the RFID chip and a radially outer surface of the circumferential tread. The RFID antenna is operably connected to the local antenna.

19 Claims, 6 Drawing Sheets

(56) References Cited

U.S. PATENT DOCUMENTS

| | | | |
|---|---|---|---|
| 6,822,582 B2 | 11/2004 | Voeller | |
| 6,885,296 B2 | 4/2005 | Hardman | |
| 7,180,409 B2 | 2/2007 | Brey | |
| 7,292,138 B2* | 11/2007 | Jang | B60C 13/00 340/426.33 |
| 7,348,878 B2 | 3/2008 | Fobelstromm | |
| 7,474,214 B2 | 1/2009 | Bauchot | |
| 7,578,180 B2 | 8/2009 | Lionetti | |
| 7,581,439 B2 | 9/2009 | Rensel | |
| 7,604,029 B2 | 10/2009 | Myatt | |
| 7,616,121 B2 | 11/2009 | Kawai | |
| 7,775,094 B2 | 8/2010 | Awad | |
| 7,797,995 B2 | 9/2010 | Schaefer | |
| 7,827,846 B2* | 11/2010 | Bauchot | B60C 11/24 152/154.2 |
| 7,832,263 B2 | 11/2010 | Rensel | |
| 7,938,157 B2 | 5/2011 | Chen | |
| 7,975,540 B2 | 7/2011 | Angell | |
| 8,065,911 B2 | 11/2011 | Taylor | |
| 8,112,318 B2 | 2/2012 | Kirian | |
| 8,141,414 B2 | 3/2012 | Braghiroli | |
| 8,157,172 B2 | 4/2012 | Fenkanyn | |
| 8,176,776 B2 | 5/2012 | Suzuki | |
| 8,532,872 B2 | 9/2013 | Boggs | |
| 8,593,357 B2 | 11/2013 | Myatt | |
| 9,718,315 B2* | 8/2017 | Peine | B60C 23/0408 |
| 2004/0134578 A1* | 7/2004 | Kleckner | B60C 9/18 152/152.1 |
| 2004/0135675 A1 | 7/2004 | Thiesen | |
| 2005/0275518 A1 | 12/2005 | Adamson | |
| 2006/0042734 A1 | 3/2006 | Turner | |
| 2006/0090558 A1* | 5/2006 | Raskas | B60C 11/24 73/146 |
| 2006/0106561 A1* | 5/2006 | Thiesen | B60C 23/007 702/104 |
| 2006/0124214 A1* | 6/2006 | Bauchot | B60C 11/24 152/154.2 |
| 2006/0190150 A1 | 8/2006 | Milot | |
| 2006/0208902 A1* | 9/2006 | Brey | B60C 11/24 340/572.8 |
| 2007/0008121 A1* | 1/2007 | Hart | G06K 19/0739 340/540 |
| 2007/0146124 A1* | 6/2007 | Shinmura | B60C 19/002 340/447 |
| 2007/0175555 A1 | 8/2007 | Myatt | |
| 2007/0222614 A1* | 9/2007 | Rapp | B60C 19/00 340/572.8 |
| 2008/0024287 A1 | 1/2008 | Boyle | |
| 2008/0084285 A1* | 4/2008 | Bhogal | B60C 11/24 340/438 |
| 2008/0093001 A1 | 4/2008 | Ono | |
| 2008/0135147 A1 | 6/2008 | Chen | |
| 2008/0278306 A1 | 11/2008 | Uehara | |
| 2009/0114322 A1* | 5/2009 | O'Brien | B29D 30/66 152/154.2 |
| 2010/0123585 A1 | 5/2010 | Fenkanyn | |
| 2011/0118989 A1* | 5/2011 | Morinaga | B60C 11/24 702/34 |
| 2011/0221587 A1* | 9/2011 | Katou | B60C 23/0408 340/443 |
| 2011/0260834 A1 | 10/2011 | Chapman | |
| 2013/0154802 A1* | 6/2013 | O'Haire | G06K 7/10009 340/10.1 |
| 2013/0169813 A1 | 7/2013 | Schaeffer | |
| 2013/0181869 A1* | 7/2013 | Chawla | G06K 7/0008 342/451 |
| 2014/0320265 A1* | 10/2014 | Jones | G06Q 10/0833 340/10.1 |
| 2016/0031272 A1* | 2/2016 | Peine | B60C 23/0408 340/442 |
| 2016/0133067 A1* | 5/2016 | Sinner | G07C 5/0808 340/459 |
| 2017/0096036 A1 | 4/2017 | Guinart | |
| 2017/0305206 A1* | 10/2017 | Sportelli | B60C 9/02 |
| 2018/0244007 A1* | 8/2018 | Barned | B29D 30/54 |

FOREIGN PATENT DOCUMENTS

| | | |
|---|---|---|
| EP | 2743101 | 6/2014 |
| JP | 2005-532205 | 10/2005 |
| JP | 2007-008249 | 1/2007 |
| JP | 2012-524948 | 10/2012 |
| WO | 2005039896 | 5/2005 |
| WO | 2006098840 | 9/2006 |
| WO | 2007127220 | 11/2007 |
| WO | 2013152294 | 10/2013 |
| WO | 2014077218 | 5/2014 |

OTHER PUBLICATIONS

RFID Privacy—an Overview of Problems and Proposed Solutions; Garfinkel, S.L. et al. Security & Privacy, IEEE (vol. 3, Issue:3) May-Jun. 2005; pp. 34-43 ISSN: 1540-7993.

Tracking RFID; Jonathan Weinberg; I/S: A Journal of Law and Policy for the Information Society [vol. 3:3, Aug. 2007].

Radio frequency identification (RFID) technology and its applications in the commercial construction industry; Mike Schneider; "University of Kentucky Civil Engineering Department Master's of Science in Civil Engineering Examination" Apr. 24, 2003.

Search Report; corresponding EP Application Serial No. EP15875929; dated Jun. 21, 2018.

\* cited by examiner

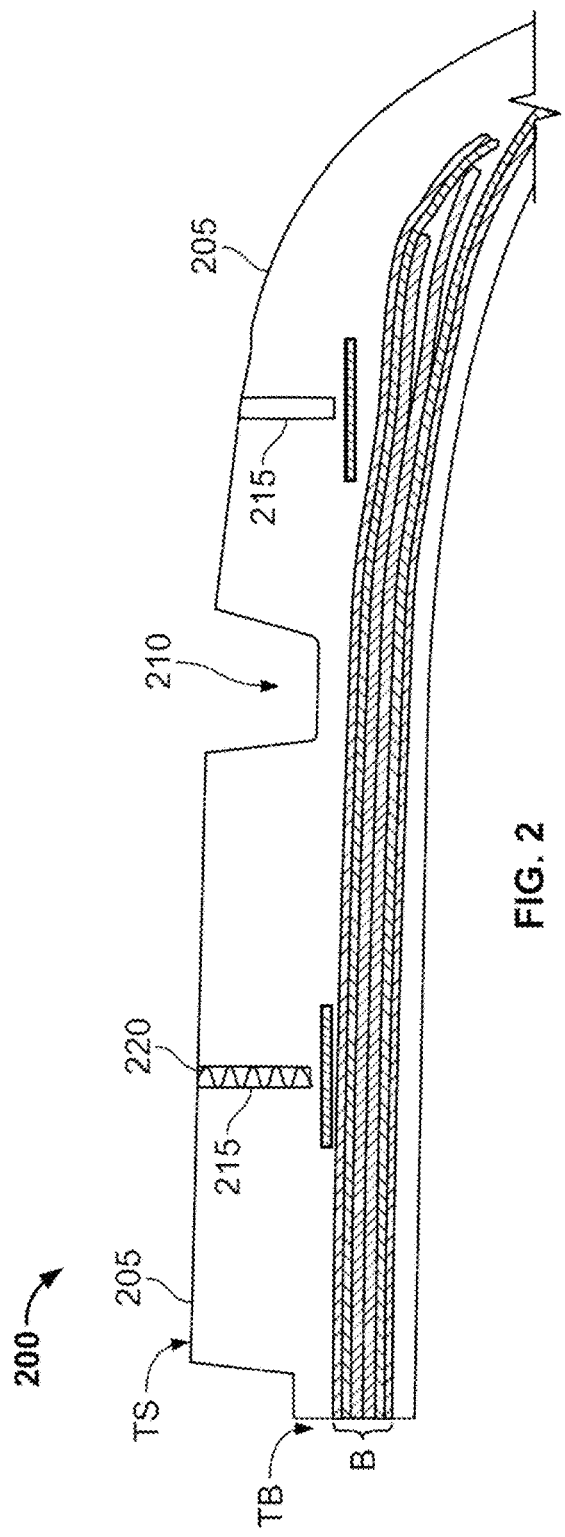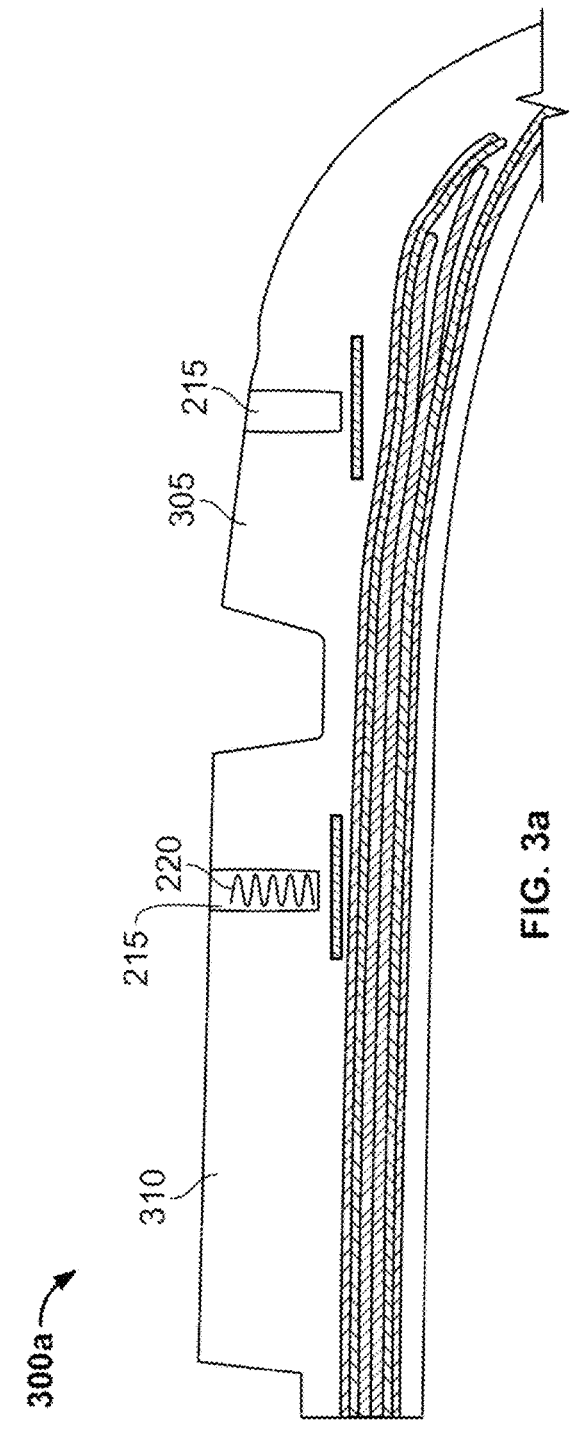

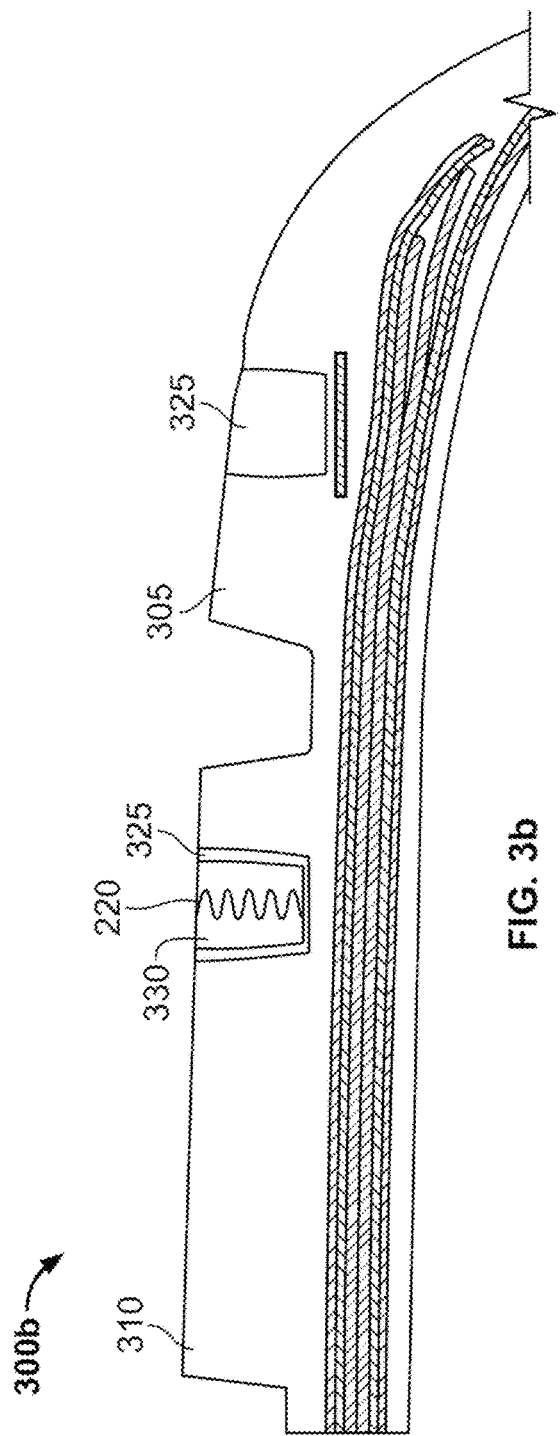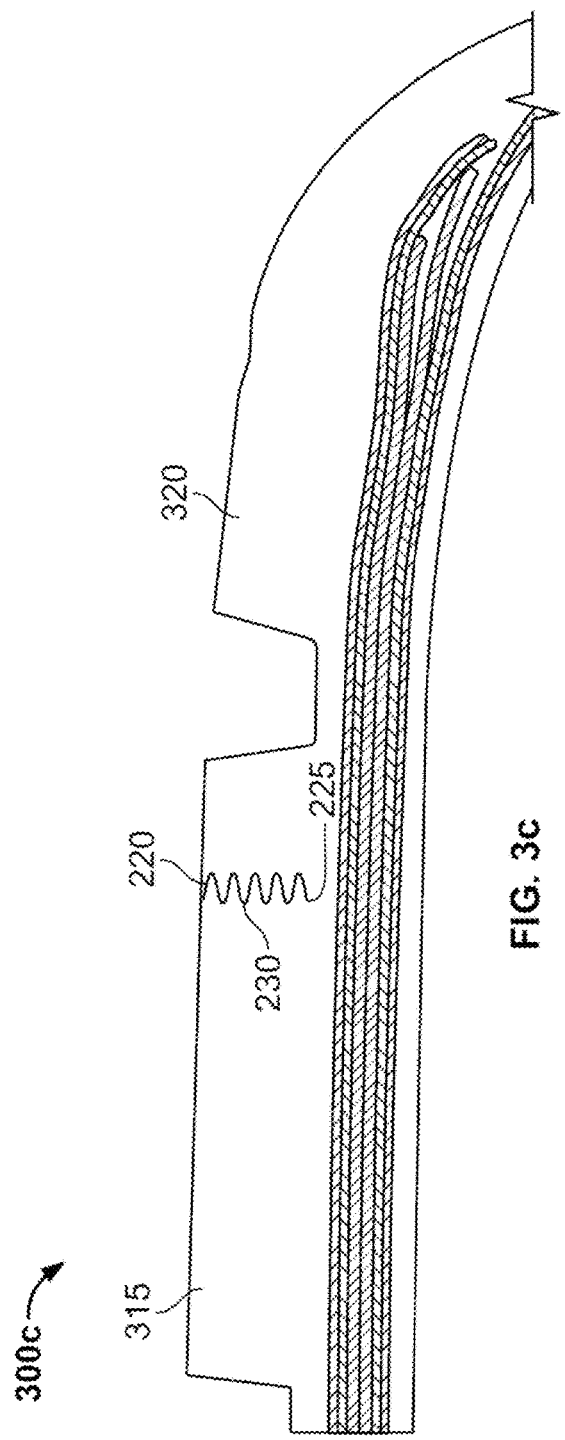

405

410

RFID WEAR SENSING FOR TIRE APPLICATIONS

CROSS-REFERENCE TO RELATED APPLICATIONS

This application is a continuation of U.S. patent application Ser. No. 15/540,375, filed on Jun. 28, 2017, which is a 371 National Stage Application of PCT/US2015/063574, filed on Dec. 3, 2015, which in turn claims priority to U.S. Provisional Patent Application No. 62/098,435, filed on Dec. 31, 2014. The disclosures of all of these applications are incorporated by reference herein in their entirety.

FIELD OF INVENTION

The present disclosure is directed to tires and tire treads featuring radio frequency identification (RFID) devices and methods of using and providing RFIDs in tire applications. More particularly, the present disclosure is directed to tires and tire treads having RFIDs for sensing tread wear, and methods of using and providing RFIDs to sense tread wear. The tires may be pneumatic or non-pneumatic.

BACKGROUND

Known RFID devices feature chips and antennas and are used for identification and memory storage purposes. In this regard, known RFID devices may be read-only, write-only, or read-and-write devices. Information is transmitted to or from RFID devices through antennas. The information is transmitted at a desired frequency that depends, in part, on the length of the antenna.

SUMMARY OF THE INVENTION

In one embodiment, a tire includes a circumferential tread and a radio-frequency identification (RFID) chip disposed below the circumferential tread. The RFID chip includes a chip casing and a local antenna. The tire further includes an RFID antenna disposed radially between the RFID chip and a radially outer surface of the circumferential tread. The RFID antenna is operably connected to the local antenna.

In another embodiment a tire tread includes a tread having a surface and at least one tread feature at the surface of the tread. The at least one tread feature is selected from a group consisting of a rib, lug, block, and slick surface. The tire tread further includes at least one RFID antenna configured to provide an operable frequency response upon receiving electromagnetic waves. The at least one RFID antenna is disposed within the at least one tread feature and has a wear rate commensurate with a wear rate of the at least one tread feature.

In a yet another embodiment, a method for sensing tire wear includes providing a tire on a vehicle, the tire having a tread, an RFID chip within a tire structure, and an RFID antenna within the tread. The RFID chip and the RFID antenna are in operable communication. The method further includes directing electromagnetic waves toward the RFID antenna, receiving a response from the RFID antenna, and correlating a power or frequency of the response to a level of wear.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 2 is a cross-section of one embodiment of a tire featuring an RFID device;

FIGS. 3a-3e are cross-sections of alternative embodiments of the tire shown in FIG. 2;

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and normal load.

"Tread depth" refers to the distance between a top surface of the tread and the bottom of a major tread groove.

"Tread width" refers to the width of the ground contact area of a tread which contacts with road surface during the rotation of the tire under normal inflation and load.

While similar terms used in the following descriptions describe common tire components, it is understood that because the terms carry slightly different connotations, one of ordinary skill in the art would not consider any one of the following terms to be purely interchangeable with another term used to describe a common tire component. Furthermore, to the extent the term "under" is used in the specification or claims, it is intended to mean not only "directly under" but also "indirectly under" where intermediary tire layers or components are disposed between two identified components or layers.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
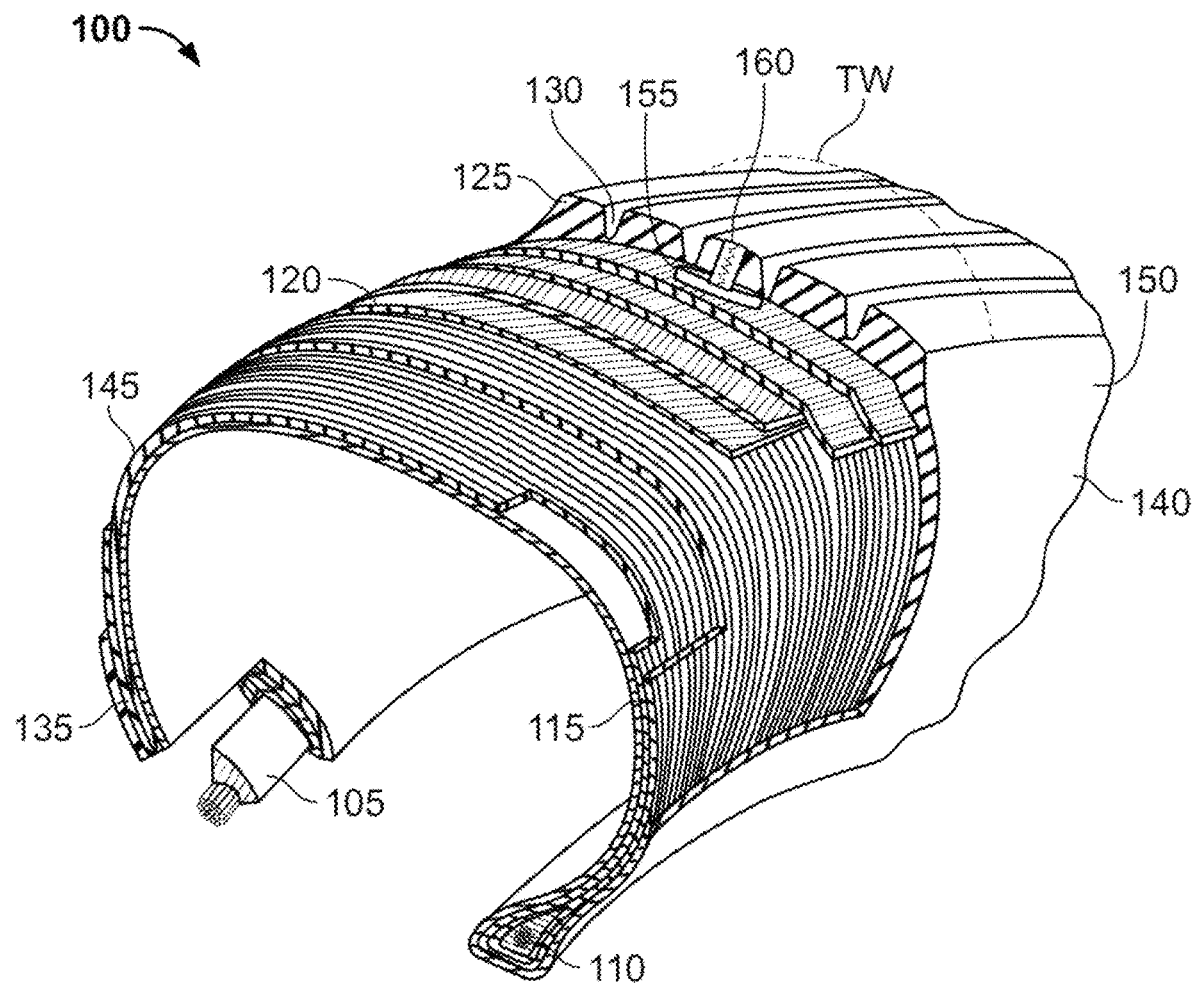
FIG. 1 is a peel-away cross-sectional perspective view of an embodiment of a tire featuring an RFID device.

FIG. 1 is a peel-away cross-sectional perspective view of an embodiment of a new tire 100. As shown, tire 100 features a first annular bead 105 and a second annular bead 110. The annular beads, in part, secure the tire to a wheel. In an alternative embodiment (not shown), the tire comprises four or more beads.

As shown, tire 100 further features a body ply 115 extending between first annular bead 105 and second annular bead 110. Body ply 115 forms an annulus and imparts shape to the tire. As one of ordinary skill in the art will understand, body ply 115 may contain reinforcing cords or fabric (not shown). In alternative embodiments (not shown), various turn-up and turn-down configurations, or multiple body plies, are used.

Tire 100 further comprises a circumferential belt 120. Circumferential belt 120 is disposed radially upward of body ply 115 and extends axially across a portion of body ply 115. As one of ordinary skill in the art will understand, circumferential belt 120 may contain steel cords and reinforcing cords (both not shown). The belt region may also contain additional reinforcing plies and cap plies (not labeled). In an alternative embodiment (not shown), the circumferential belt lacks metal.

Tire 100 further comprises a circumferential tread 125 having circumferential grooves 130. Circumferential tread 125 is disposed radially upward of circumferential belt 120 and extends axially across a portion of body ply 115. Circumferential grooves 130 divide circumferential tread 125 into ribs. In FIG. 1, TW denotes the tread width of circumferential tread 125.

As one of ordinary skill in the art will understand, circumferential tread 125 is affixed to tire 100 when tire 100 is new. In an alternative embodiment (not shown), the circumferential tread is affixed as a retread.

Tire 100 further comprises a first sidewall 135 and a second sidewall 140. First sidewall 135 extends between the first annular bead 105 and a first shoulder 145, which is proximately associated with an edge of circumferential tread 125. Second sidewall 140 extends between the second annular bead 110 and a second shoulder 150, which is proximately associated with an opposite edge of circumferential tread 125. In an alternative embodiment (not shown), the sidewall is proximately associated with an undertread (not shown).

Tire 100 further comprises a radio-frequency identification (RFID) chip 155. RFID chip 155 is disposed radially between circumferential belt 120 and circumferential tread 125. Although not shown, RFID chip 155 features a casing that surrounds the chip and a local antenna that is configured to couple with other antennas. RFID chip 155 is secured within tire 100 by vulcanization, adhesives, patches, barbs, or through other means and methods known to one of skill in the art. Because RFID chip 155 is secured within tire 100, RFID chip 155 does not move within tire 100, and it does not escape, eject from, or leave tire 100 after a period of use. RFID chip 155 does not intentionally cease operation when it is eroded or compromised. In an alternative embodiment (not shown), the RFID chip is disposed within the undertread (not shown). In a different embodiment, the RFID chip is disposed between a tire casing and a retread. In additional embodiments, the RFID chip is disposed within, upon, or adjacent to a shear band.

Tire 100 further comprises an RFID tag antenna 160. RFID tag antenna 160 is disposed radially between the RFID chip 155 and the radially outer surface of the circumferential tread 125. RFID tag antenna 160 is secured within tire 100 such that it does not move within tire 100, and it does not escape, eject from, or leave tire 100 after a period of use. RFID tag antenna 160 does not intentionally cease operation when it is eroded or compromised.

As depicted in FIG. 1, RFID tag antenna 160 is a wire that has been formed into a coil shape. The wire has a wire length and a wire diameter. When the wire is formed into a coil shape, the resulting coil has a coil diameter and a coil length. When dimensions of an antenna are discussed herein, it should be understood that the dimensions being referred to are those of the coil (or other alternative shape), not the dimensions of the wire that forms the antenna.

Optionally, RFID tag antenna 160 contains barbs. In an alternative embodiment (not shown), the RFID tag antenna is helical. In another embodiment, the RFID tag antenna is cylindrical. In a different embodiment, the RFID tag antenna is a prism. In yet another embodiment, the RFID tag antenna is a twisted prism. In additional embodiments, the RFID tag antenna is planar and configured in a shape selected from the group consisting of sine waves, s-curves, ovals, and loops.

RFID tag antenna 160 is coextensive with a radially outer surface of the circumferential tread 125. Thus, a radially outer surface of RFID tag antenna 160 is exposed when the tread is new. In an alternative embodiment (not shown), the RFID tag antenna is submerged under the circumferential tread when the tire is new and becomes exposed after an initial amount of wear.

As also shown in FIG. 1, RFID tag antenna 160 has a coil length that extends 100% of the tread depth. Thus, as shown, the RFID tag antenna 160 extends from a radially outer surface of the circumferential tread 125 to the base of circumferential tread 125 (beyond the depth of any circumferential grooves 130). In alternative embodiments (not shown), the RFID tag antenna extends between 50 and 150% of the tread depth. As one of skill in the art will understand, the RFID tag antenna continues into other portions of the tire when its length exceeds the tread depth.

As further shown in FIG. 1, the coil diameter of RFID tag antenna 160 is a fraction of the width of RFID chip 155. In an alternative embodiment (not shown), the RFID tag antenna has a coiled width between 0.001 and 5% of the tread width. In another embodiment, the RFID tag antenna has a coiled diameter between 0.1 and 7 mm. In a different embodiment, the antenna has a coiled diameter between 7.1 and 20 mm.

Although not shown, the RFID tag antenna is made of a conductive material. Exemplary materials include, without limitation, aluminum, copper, and alloys of aluminum and copper. In one embodiment, the RFID tag antenna is made of substantially pure aluminum. In another embodiment, the RFID tag antenna has a Mohr's hardness of less than 4.0. In a different embodiment, the RFID tag antenna has a Mohr's hardness of less than 3.1.

While a pneumatic tire is shown in FIG. 1, the RFID and antenna may also be employed in the tread of a non-pneumatic tire. The basic structure of non-pneumatic tires is known in the art, and is not presented here.

FIG. 2 is a cross-section of one embodiment of a tire 200. As shown, tire 200 is bound by tread surface TS and tread base TB. Tread surface TS forms the outer peripheral surface of tire 200, and it extends across the entire width and length of tire 200 (including any grooves or sipes present). Tread base TB forms the inner peripheral surface of tire 200, and it extends across the entire width and length of tire 200. As one of ordinary skill in the art will understand, tread base TB is placed on a green tire or a tire carcass during curing and adhesion processing steps.

As shown, tire 200 features ribs 205 and circumferential grooves 210. The circumferential grooves 210 divide tire 200 into ribs 205. As one of ordinary skill in the art will understand, the circumferential grooves 210 enhance tire performance in wet conditions.

Tire 200 further comprises an antenna slot 215, which is a void that receives antenna 220. As depicted, antenna slot 215 is a narrow, radially-oriented cylinder whose height and diameter substantially coincide with the height and diameter of antenna 220. In alternative embodiments (not shown), the height or the diameter of the antenna slot varies between 80 and 120% of the height or diameter of the antenna, respectively. In other embodiments, the antenna slot is a spiral, a prism, or a twisted prism. In a different embodiment, a hole, which is larger than a slot, is utilized.

Tire 200 further comprises a helical antenna 220. Antenna 220 fits inside antenna slot 215 and forms a portion of tread surface TS when tire 200 is new. Antenna 220 may be held in place by friction, or prior to vulcanization it may be free to move from antenna slot 215. The antenna couples with an RFID chip (not shown), which is disposed under the tread base. In an alternative embodiment (not shown), the RFID chip is disposed within the tread base. In another embodiment, the RFID chip is provided within a hole in the tread base.

FIGS. 3a-3d are alternative embodiments of the tire shown in FIG. 2. The embodiments shown in FIGS. 3a-3d may be implemented in passenger, light truck, heavy-duty, and racing applications. One of ordinary skill in the art would understand that features described with respect to one embodiment may be implemented in other embodiments described in this disclosure.

FIG. 3a is a cross-sectional view of a tire 300a. As shown, tire 300a features a first rib 305 and a second rib 310.

As shown, first tread block 305 features an antenna slot 215 (shown without an antenna). Antenna slot 215 is disposed radially. As one of ordinary skill in the art will understand, antenna slot 215 may be disposed anywhere within first tread block 305. In an alternative embodiment (not shown), the first tread block features two or more antenna slots. In another embodiment, the antenna slot is disposed substantially radially, as it is angled slightly with respect to the radial direction.

Second tread block 310 features an antenna slot 215 and an antenna 220 that is topped by a rubber cap, and is thus slightly submerged below the tread surface. As one of ordinary skill in the art will understand, antenna slot 215 or antenna 220 may be coated with adhesive before antenna 220 is inserted into antenna slot 215.

FIG. 3b, like FIG. 3a, is a cross-sectional view of a tire 300b that features a first rib 305 and a second rib 310.

First rib 305 features a hole 325 (shown unfilled), which receives an antenna encased in erodible matter (such as rubber or thermoplastic matter). As depicted, hole 325 is cylindrical, but hole 325 is not limited to cylindrical shapes. Likewise, hole 325 has a height equal to the tread depth, but the depth of hole 325 need not equal the tread depth. In general, hole 325 has a greater volume than an antenna slot 215.

Second rib 310 features a hole 325 filled with an encasement 330. As shown, encasement 330 holds antenna 220 in the radial direction. While encasement 330 is shown as a cylinder, encasement 330 is not limited to cylindrical shapes. As one of ordinary skill in the art will understand, encasement 330 or hole 325 may be coated with an adhesive before encasement 330 and hole 325 are joined.

FIG. 3c is a cross-sectional view of a tire 300c. As shown, tire 300c features a first tread block 315 and a second tread block 320.

First tread block 315 features an antenna 220, but it lacks an antenna slot. In this embodiment, antenna 220 further comprises a sharp tip 225. The antenna is forcibly propelled into first tread block 305. The antenna will be turned or corkscrewed as it is forcibly propelled into first tread block 305. In this embodiment, antenna 220 further comprises at least one barb 230 that prohibits movement of the antenna. In an alternative embodiment (not shown), the tread block features an antenna slot, and the at least one barb of the antenna digs into an antenna slot wall.

Figure 3D:
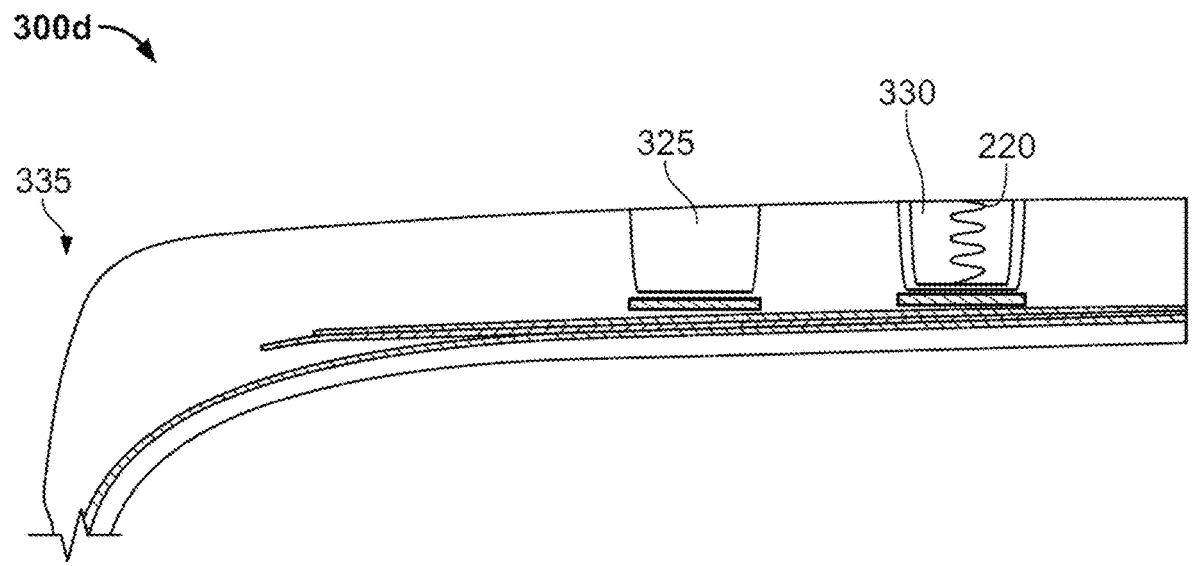

FIG. 3d is a cross-sectional view of a tire 300d. As shown, tire 300d features at least one hole 325. Tire 300d further includes a hole filled with an encasement 330. As shown, encasement 330 holds antenna 220 in the radial direction.

In an alternative embodiment (not shown), one hole is placed in an outer third of the tread and another hole is placed in the middle third of the tread. In another embodiment, one hole is placed in a leading half of a lug and another hole is placed on a trailing half of a lug.

Figure 3E:
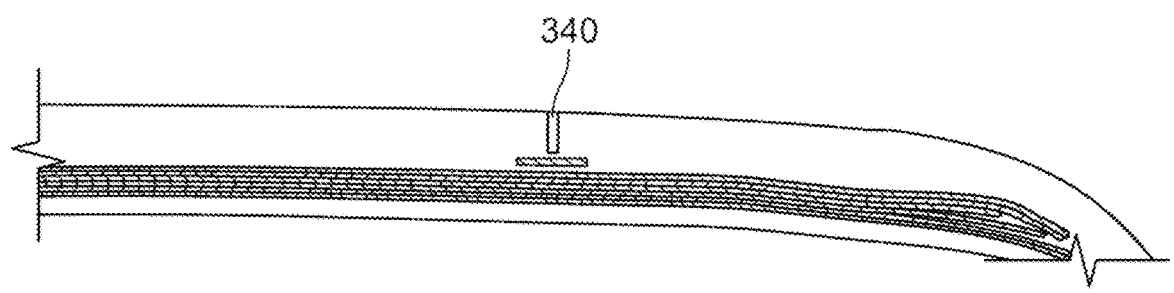

FIG. 3e is a cross-sectional view of a tire 300e suited for applications requiring high grip, such as an airplane or racing tire might require. As shown, tire 300e features narrow grooves, a predominately flat tread surface, and at least one antenna 340. In FIG. 3e, antenna 340 is a simple cylinder. The simple cylinder may be made of conductive material capable of transmitting an RFID signal. In one embodiment, the simple cylinder contains a high concentration of carbon black. In another embodiment, the simple cylinder contains a conductive liquid that has been interspersed in material in the simple cylinder.

In an alternative embodiment (not shown), the narrow grooves in the tread are omitted. In another embodiment, the grooves in the tread are full circumferential grooves. As one of ordinary skill in the art will understand, each of the embodiments disclosed in this paragraph feature a slick surface.

While the embodiments depicted in FIGS. 3a-3e show multiple RFID tag antenna s, it should be understood that a single RFID tag antenna may be used in a tire constructed in accordance with these embodiments. It should also be understood that, although each figure illustrates a single type of RFID tag antenna, it may be desirable to employ different types of RFID tag antenna s in the same tire.

Figure 4A:
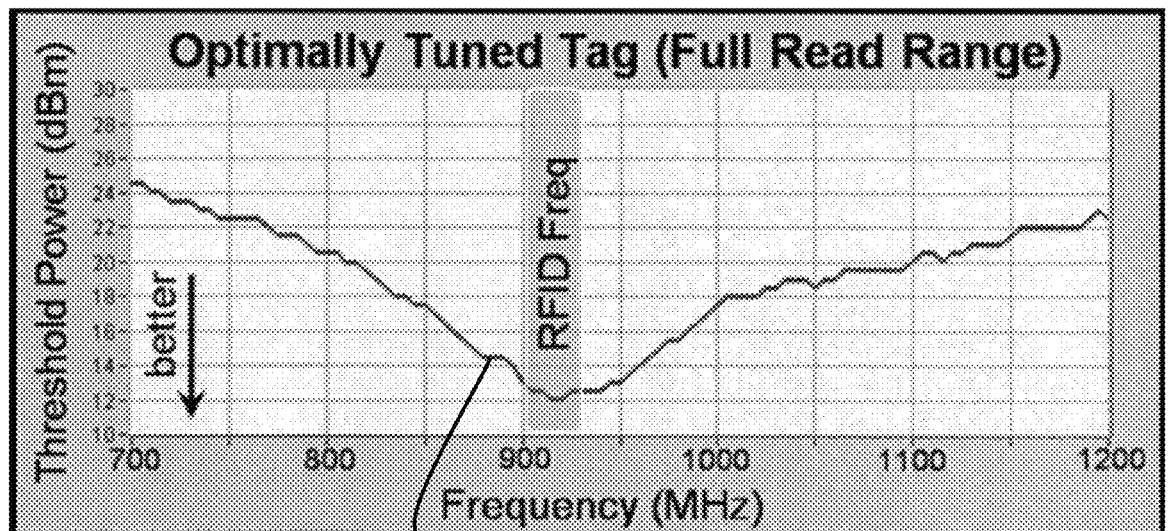
FIGS. 4a-4b are graphs showing frequency responses from an antenna.

FIG. 4a is a graph showing a first frequency response 405 of an antenna. As shown, the antenna is at its original length, is optimally tuned, and is embedded in a tire. In this condition, the antenna emits a response of approximately 915 MHz at an initial (minimum) threshold power of 12 dBm. In alternative embodiments (not shown), the antenna emits an operable frequency response between 900 and 930 MHz upon receiving electromagnetic waves having a power between 10 and 30 dBm. In another embodiment, the antenna emits an operable frequency response between 900 and 930 MHz upon receiving electromagnetic waves having a power between 12 and 24 dBm. In a different embodiment, the antenna emits an operable frequency response between 900 and 930 MHz upon receiving electromagnetic waves having a power between 14 and 18 dBm. In yet further embodiments (not shown), the range of the operable frequency response is between 902 and 928 MHz, 902 and 918 MHz, 910 and 920 MHz, 912 and 918 MHz, and 905 and 910 MHz.

Figure 4B:
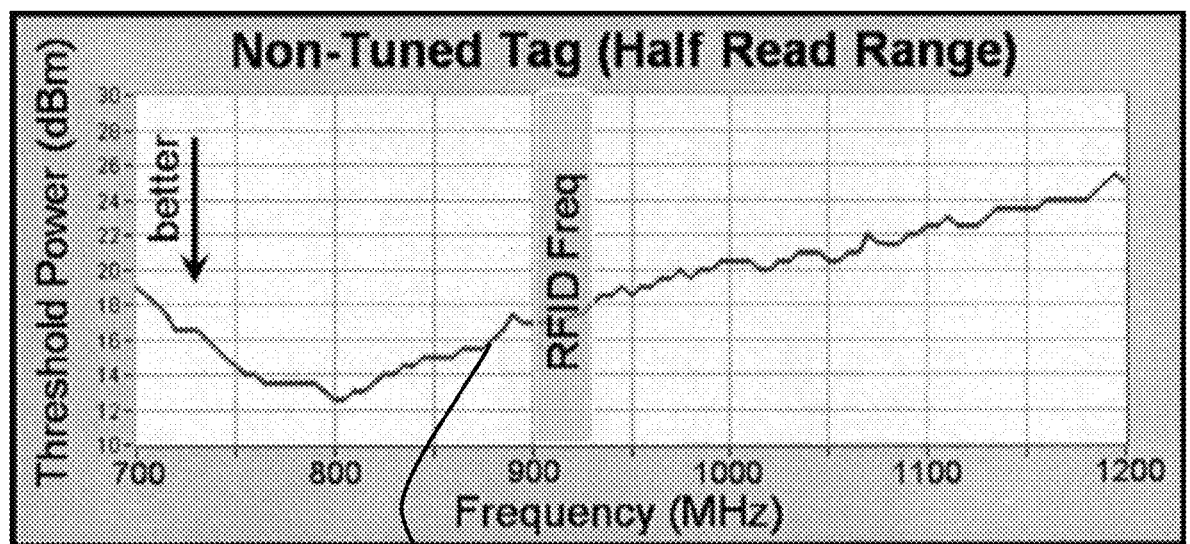

FIG. 4b is a graph showing a second frequency response 410 taken using the same antenna utilized to produce first frequency response 405 in FIG. 4a. In this instance, the second frequency response 410 shown in FIG. 4b represents a measurement taken after the antenna has worn to a shorter length. The second frequency response 410 correlates to a specific antenna length. The specific antenna length, in turn, correlates to a tread depth. Thus, the difference between the power required to elicit a response from the antenna at a given frequency can be used to track tread wear. Alternatively, the difference in frequency response at a given power can be used to track tread wear.

Figure 5:
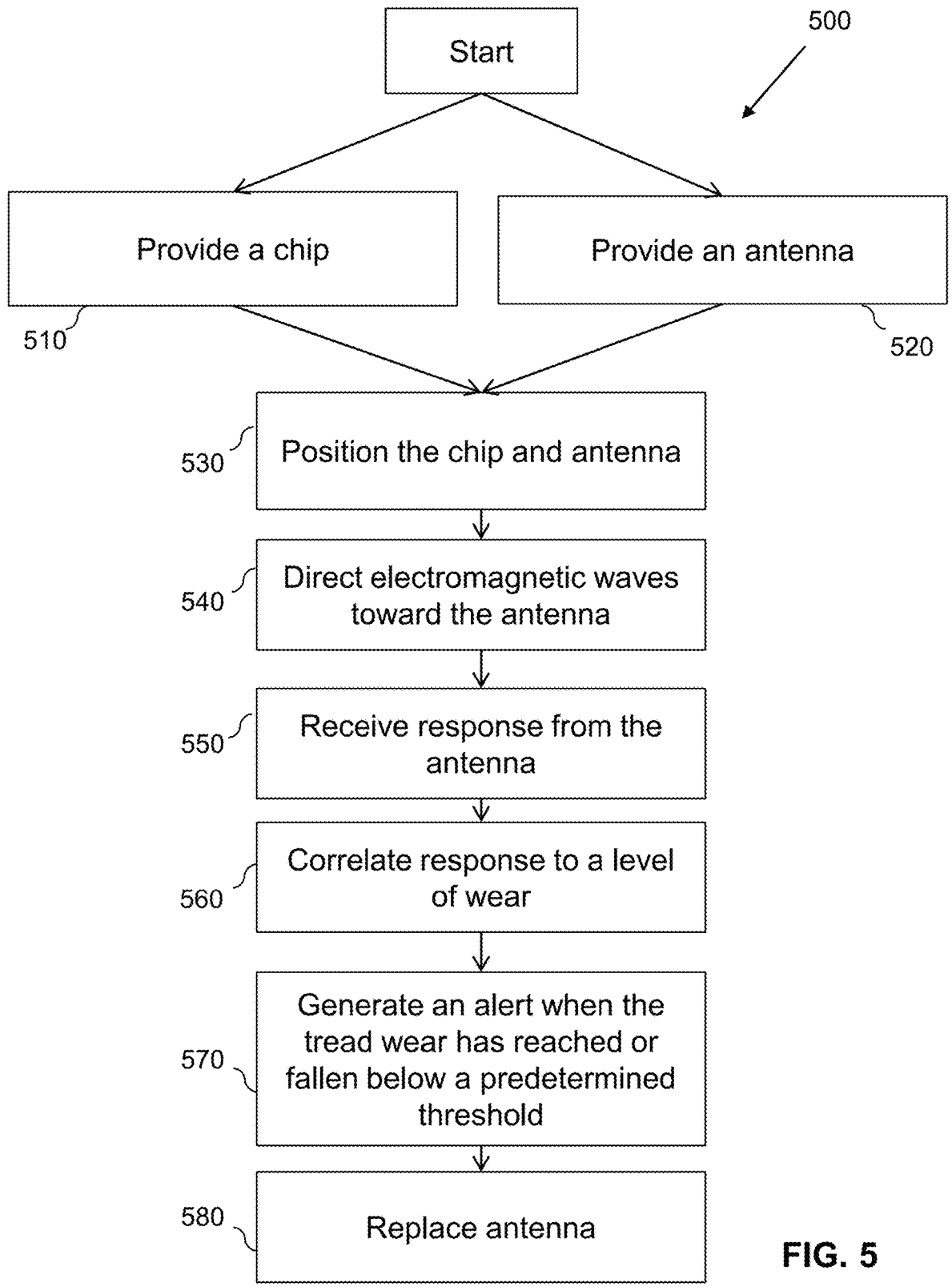
FIG. 5 is a flowchart describing one embodiment of a method for providing and using an RFID in a tire or tire tread.

FIG. 5 is a flowchart describing one embodiment of a method 500 of using an RFID in a tire or tire tread.

As depicted in FIG. 5, method 500 starts with providing RFID components. Specifically, method 500 begins with providing a chip 510 and providing an erodible antenna 520. Providing step 510 and providing step 520 may be performed concurrently or independently. Likewise, providing step 510 and providing step 520 may be performed before or after vulcanization (or other pre and post cure processing steps).

In providing step 510, the chip is provided within a tire structure. In one embodiment, the chip is provided within a tire structure by placing the chip on a tire structure during the manufacturing process, and then additional tire components are layered on top of the chip, thereby embedding it in the tire. In a different embodiment, the chip is provided within a tire structure, and vulcanization, adhesives, patches, barbs, are used to hinder movement of the chip.

In providing step 520, an erodible antenna is provided within a tire tread. In one embodiment, the antenna is forcibly propelled into the tread. The antenna may be forcibly propelled via pulsating force (e.g., tapping or pounding), constant force (e.g., pushing or screwing), pneumatic force (e.g., an air gun), or electromagnetic force (e.g., a nail gun).

In another embodiment of providing step 520, the antenna is provided by being placed within, or forcibly propelled into, an antenna slot. An antenna slot may be created using, without limitation, a needle, cannula, blade, pin, nail, drill, or tire mold. Alternatively, an antenna slot may be created using 3D printing or subtractive manufacturing. The diameter of the antenna slot is between 80 and 120% of the diameter of the antenna. As one of ordinary skill in the art will understand, adhesives or liquid rubber may be used to fix the antenna within the antenna slot.

In an alternative embodiment, the antenna is provided by being placed within, or forcibly propelled into, a hole. A hole may be created using, without limitation, a needle, cannula, blade, pin, nail, drill, tire mold, 3D printing, or subtractive manufacturing. In alternative embodiments, the diameter of the hole is between 120 and 200% of the diameter of the antenna. As one of ordinary skill in the art will understand, adhesives or liquid rubber may be used in conjunction with providing the antenna within the hole.

In yet another embodiment of providing step 520, the antenna is encased with erodible matter. The antenna may be completely encased with erodible matter, or one or more surfaces of the antenna, such as a radial outer surface, may be left exposed. The antenna may be encased with erodible matter via forcible propulsion into the erodible matter, injection molding, or other methodology known to one of skill in the art. The encasement is then placed within, or forcibly propelled into a hole. As one of ordinary skill in the art will understand, adhesives or liquid rubber may be used in conjunction with providing the encasement within the hole.

In connection with providing step 510 and providing step 520, a user or machine positions the chip and erodible antenna 530 within operable communication of each other. Positioning step 530 may be performed concurrently or independently of providing step 510 and providing step 520. Likewise, positioning step 530 may be performed prior to or following vulcanization (or other pre and post cure processing steps).

In positioning step 530, the chip and erodible antenna are positioned within operable communication (e.g., a few millimeters) of each other. In another embodiment, the chip and erodible antenna are positioned within operable communication of each other by positioning an end of the antenna no more than 1 cm from the chip. In an alternative embodiment, the erodible antenna contacts the chip.

Once providing step 510, providing step 520, and positioning step 530 are performed, electromagnetic waves are directed 540 toward the antenna. The electromagnetic waves may be directed toward the antenna by an interrogator attached to a vehicle, an interrogator attached to a stationary, pass-by structure, or a portable interrogator. Suitable locations and embodiments for the stationary, pass-by interrogator include, without limitation, a garage, worksite, or service station.

In directing step 540, electromagnetic waves are directed toward the antenna under stationary conditions (such as when a tire is not moving) or when the tire is moving. The power of the electromagnetic waves is increased until a response is received 550. The minimal amount of power needed to receive a response, the threshold power, is recorded. Receiving step 550 may be performed concurrently or independently of directing step 540.

In one embodiment, the response has a frequency between 900 and 930 MHz and a power between 10 and 30 dBm. The response may be received by the interrogators discussed above, or by a different device.

In one embodiment, the response is received at a transponder attached to a vehicle. In another embodiment, the response is received at a transponder attached to a stationary, pass-by reader. In a different embodiment, a portable reader receives the response.

After receiving step 550 is commenced, the response is correlated 560 to a level of wear. Correlating step 560 may be performed concurrently or independently of directing step 540 and receiving step 550.

In correlating step 560, the threshold power of the response required to receive a response is used to estimate the antenna length, and by extension, the tread depth. An interrogator may then look up values stored on the RFID chip to calculate an antenna length. Table 1, below, is an exemplary lookup table used to calculate tread wear:

| Threshold power (dBm) at 915 MHz | Antenna length (mm) |
| --- | --- |
| 12 | 78 |
| 16 | 72 |
| 20 | 66 |
| 23 | 60 |

In an alternative embodiment of correlating step 560, the power or frequency of the response received from directing electromagnetic waves at the antenna is compared to an initial response value corresponding to an initial (unworn) state of the antenna. The value of the received response is then processed along with the initial response value in an algorithm, which is used to calculate the worn antenna height. By extension, tread wear is calculated. In one embodiment, the power or frequency measurements represent an antenna length and can be utilized without knowing a prior history of the specific RFID tag antenna. In an alternative embodiment, the RFID chip may also store ID information and antenna history, and an interrogator may look up past values stored on the RFID chip to calculate an antenna length using the history.

In another alternative embodiment of correlating step 560, the frequency is used to estimate tread depth. The RFID tag antenna has a degradation ratio of 0.1-0.9 dBm threshold power at 915 MHz per mm of antenna length change.

After correlating step 560 is commenced, the correlation may be used in generating 570 an alert when the tread wear has reached a predetermined threshold. The generating step 570 may be performed concurrently or independently of directing step 540, receiving step 550, and correlating step 560.

In generating step 570, the height of a worn antenna is compared against a predetermined threshold. If the height of the worn antenna has reached the threshold, then an alert relating to the worn state is generated. In another embodiment, a wear alert (or report) is generated at regular intervals for predictive maintenance purposes. In a different embodiment, a wear alert (or report) is generated at regular intervals for quality assurance and performance tracking purposes.

In an additional step of method 500, the antenna provided in providing step 520 is replaced 580 with a second antenna. Replacement step 580 can be performed in connection with repair or retread acts.

As one of ordinary skill in the art would understand, the tire embodiments described in this disclosure may be configured for use on a vehicle selected from the group consisting of motorcycles, tractors, agricultural vehicles, lawnmowers, golf carts, scooters, airplanes, military vehicles, passenger vehicles, hybrid vehicles, high-performance vehicles, sport-utility vehicles, light trucks, heavy trucks, heavy-duty vehicles, and buses.

One of ordinary skill in the art would also understand that the embodiments described in this disclosure may be utilized with a variety of tread patterns, including, without limitation, symmetrical, asymmetrical, directional, studded, and stud-less tread patterns.

One of ordinary skill in the art would also understand that the embodiments described in this disclosure may be utilized, without limitation, in high-performance, winter, all-season, touring, non-pneumatic, and retread tire applications.

One of ordinary skill in the art would also understand that the embodiments described in this disclosure may be utilized in large tires. Examples of large tires include, but are not limited to, agricultural tires, mining tires, forestry tires, skid steer tires, construction tires, monster-truck tires, and other heavy-duty vehicle tires.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
   a circumferential belt in a crown region of the tire;
   a circumferential tread disposed above the circumferential belt;
   a radio-frequency identification (RFID) chip disposed radially between the circumferential belt and the circumferential tread, wherein the RFID chip includes a chip casing and a local antenna;
   an RFID antenna disposed radially between the RFID chip and a radially outer surface of the circumferential tread, wherein the RFID antenna is operably connected to the local antenna, wherein the RFID antenna has a degradation ratio of 0.1-0.9 decibel-milliwatts (dBm) threshold power at 915 megahertz (MHz) per millimeter (mm) of antenna length change.

2. The tire of claim 1, wherein the RFID antenna is an elongated, metallic spiral having a coil length and a coil diameter.

3. The tire of claim 1, wherein the tire completely encases the RFID antenna when the circumferential tread is new.

4. The tire of claim 1, wherein a radial outer surface of the RFID antenna is exposed when the circumferential tread is new.

5. The tire of claim 1, wherein the RFID chip is disposed within an undertread of the tire.

6. The tire of claim 1, wherein the circumferential tread is a retread.

7. The tire of claim 1, wherein the RFID chip is adjacent to a shear band.

8. A tire tread comprising:
   a tread having a surface;
   at least one tread feature at the surface of the tread, wherein the at least one tread feature is selected from a group consisting of a rib, lug, block, and slick surface; and
   at least one RFID antenna configured to provide an operable frequency response upon receiving electromagnetic waves, wherein the at least one RFID antenna is disposed within the at least one tread feature and has a wear rate commensurate with a wear rate of the at least one tread feature, and wherein the at least one RFID antenna has a degradation ratio of 0.1-0.9 dBm threshold power at 915 MHz per mm of antenna length change.

9. The tire tread of claim 8, wherein the at least one tread feature further comprises a rubber encasement that surrounds at least two sides of the at least one RFID antenna.

10. The tire tread of claim 9, wherein the at least one RFID antenna includes a second antenna and wherein a second rubber cylinder surrounds at least two sides of the second antenna.

11. The tire tread of claim 8, wherein the at least one RFID antenna is configured to receive electromagnetic waves from an interrogator that is external to the tread.

12. The tire tread of claim 8, wherein the at least one RFID antenna extends 100% of a depth of the tread.

13. A method for sensing tire wear comprising:
providing a tire on a vehicle, the tire having a belt and a tread, an RFID chip disposed radially between the belt and the tread, and an RFID antenna within the tread, wherein the RFID antenna has a degradation ratio of 0.1-0.9 dBm threshold power at 915 MHz per mm of antenna length change, and wherein the RFID chip and the RFID antenna are in operable communication;
directing electromagnetic waves toward the RFID antenna;
receiving a response from the RFID antenna; and
correlating a power or frequency of the response to a level of wear.

14. The method of claim 13, wherein directing electromagnetic waves toward the RFID antenna includes attaching an interrogator to the vehicle, wherein the interrogator directs the electromagnetic waves towards the RFID antenna.

15. The method of claim 13, wherein directing electromagnetic waves toward the RFID antenna includes driving the vehicle by a stationary, pass-by structure having an interrogator disposed thereon.

16. The method of claim 13, wherein directing electromagnetic waves toward the RFID antenna includes using a portable interrogator to direct electromagnetic waves toward the RFID antenna.

17. The method of claim 13, further comprising increasing a power of the electromagnetic waves until the response from the RFID antenna is received.

18. The method of claim 13, further comprising generating an alert when the level of wear has reached a predetermined threshold.

19. The method of claim 13, further comprising replacing the RFID antenna with a second RFID antenna.

* * * * *